US012058447B2

(12) United States Patent
Feng et al.

(10) Patent No.: US 12,058,447 B2
(45) Date of Patent: Aug. 6, 2024

(54) AUTOFOCUS (AF) AND AUTO EXPOSURE CONTROL (AEC) COORDINATION

(71) Applicant: QUALCOMM Incorporated, San Diego, CA (US)

(72) Inventors: Wen-Chun Feng, New Taipei (TW); Hsuan-Ming Liu, New Taipei (TW); Hui Shan Kao, New Taipei (TW); Hang-Wei Liaw, North District (TW); Yawen Chi, Taoyuan (TW)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/647,150

(22) Filed: Jan. 5, 2022

(65) Prior Publication Data

US 2023/0015621 A1    Jan. 19, 2023

Related U.S. Application Data

(60) Provisional application No. 63/218,828, filed on Jul. 6, 2021.

(51) Int. Cl.
*H04N 23/73* (2023.01)
*H04N 23/71* (2023.01)

(52) U.S. Cl.
CPC ............. *H04N 23/73* (2023.01); *H04N 23/71* (2023.01)

(58) Field of Classification Search
CPC ...... H04N 23/73; H04N 23/71; H04N 23/743; H04N 23/67
See application file for complete search history.

(56) References Cited

U.S. PATENT DOCUMENTS

| | | | |
|---|---|---|---|
| 5,745,175 A | 4/1998 | Anderson | |
| 9,191,571 B2* | 11/2015 | Nakai | H04N 23/64 |
| 2005/0219403 A1* | 10/2005 | Hyodo | G03B 3/12 |
| | | | 348/E5.045 |

(Continued)

OTHER PUBLICATIONS

International Search Report and Written Opinion—PCT/US2022/073394—ISA/EPO—Nov. 18, 2022.

*Primary Examiner* — Jason A Flohre
(74) *Attorney, Agent, or Firm* — QUALCOMM Incorporated

(57) ABSTRACT

The present disclosure provides systems, apparatus, methods, and computer-readable media that support improved image signal processing, particularly in low-light or high dynamic range (HDR) scenes. The image processing techniques may include performing two automatic exposure control (AEC) operations, in which a first AEC operation targets obtaining good conditions for autofocus (AF) operation, and a second AEC operation follows the AF operation and targets obtaining good conditions for an image capture. The image processing techniques may also include communication between the AEC operations and AF operations to coordinate the operations by locking and releasing exposure levels and focus positions as part of the image signal processing. In one aspect, a processing technique may include an AF measuring statistics from target, coordinating with AEC, and performing interleaving of a lock-and-resume state machine to achieve better AF result in challenging low-light or HDR scenes while maintaining an overall image quality.

25 Claims, 6 Drawing Sheets

(56) References Cited

U.S. PATENT DOCUMENTS

| | | | | |
|---|---|---|---|---|
| 2010/0020198 A1* | 1/2010 | Okamoto | H04N 23/71 | |
| | | | 348/E5.037 | |
| 2010/0091176 A1* | 4/2010 | Cha | H04N 23/75 | |
| | | | 348/E5.04 | |
| 2011/0122269 A1* | 5/2011 | Zhao | H04N 23/687 | |
| | | | 348/208.99 | |
| 2012/0162462 A1* | 6/2012 | Takeuchi | H04N 23/673 | |
| | | | 348/222.1 | |
| 2012/0188386 A1* | 7/2012 | Kulkarni | H04N 23/67 | |
| | | | 348/222.1 | |
| 2012/0320258 A1* | 12/2012 | Nakagawara | H04N 23/675 | |
| | | | 348/E5.045 | |
| 2013/0242173 A1* | 9/2013 | Kadohara | H04N 23/672 | |
| | | | 348/349 | |
| 2015/0124157 A1* | 5/2015 | Hongu | H04N 23/672 | |
| | | | 348/353 | |
| 2017/0366727 A1* | 12/2017 | Uenishi | H04N 23/663 | |
| 2018/0191934 A1* | 7/2018 | Song | H04N 23/73 | |
| 2018/0367725 A1* | 12/2018 | Li | H04N 23/6811 | |
| 2019/0033555 A1* | 1/2019 | Lee | H04N 25/704 | |
| 2020/0099853 A1* | 3/2020 | Sanno | H04N 23/675 | |
| 2020/0236269 A1 | 7/2020 | Nikhara et al. | | |
| 2021/0144289 A1* | 5/2021 | Vdovychenko | H04N 23/60 | |
| 2021/0400180 A1* | 12/2021 | Omata | G06T 7/80 | |
| 2023/0179869 A1* | 6/2023 | Mimura | H04N 23/72 | |
| | | | 348/362 | |

* cited by examiner

AUTOFOCUS (AF) AND AUTO EXPOSURE CONTROL (AEC) COORDINATION

CROSS-REFERENCE TO RELATED APPLICATIONS

This application claims the benefit of U.S. Provisional Patent Application No. 63/218,828 entitled, "AUTOFOCUS (AF) AND AUTO EXPOSURE CONTROL (AEC) COORDINATION," filed on Jul. 6, 2021, which is expressly incorporated by reference herein in its entirety.

TECHNICAL FIELD

Aspects of the present disclosure relate generally to image signal processing. Some features may enable and provide improved image signal processing, including improved autofocus (AF).

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Image capture devices have inherent limitations. Image quality is related to a sensitivity of an image sensor capturing an image and the brightness of the scene being captured in the image. Limits on the image sensor capability and the scene lighting can inhibit the capturing of high-quality images.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure provides systems, apparatus, methods, and computer-readable media that support improved image signal processing, particularly in low-light or high dynamic range (HDR) scenes. The image processing techniques may include performing two automatic exposure control (AEC) operations, in which a first AEC operation targets obtaining good conditions for autofocus (AF) operation, and a second AEC operation follows the AF operation and targets obtaining good conditions for an image capture. The image processing techniques may also include communication between the AEC operations and AF operations to coordinate the operations by locking and releasing exposure levels and focus positions as part of the image signal processing. In one aspect, a processing technique may include an AF measuring statistics from target, coordinating with AEC, and performing interleaving of a lock-and-resume state machine to achieve better AF result in challenging low-light or HDR scenes while maintaining an overall image quality.

In one aspect of the disclosure, a method for image processing and/or image capturing includes performing a first auto exposure control operation with a first set of target parameters to determine a first exposure level; performing a first auto focus operation at the first exposure level to determine a first focus position; performing a second auto exposure control operation with a second set of target parameters to determine a second exposure level after performing the first auto focus operation; and/or capturing a first image frame at the second exposure level.

In an additional aspect of the disclosure, an apparatus includes at least one processor and a memory coupled to the at least one processor. The at least one processor is configured to perform operations including performing a first auto exposure control operation with a first set of target parameters to determine a first exposure level; performing a first auto focus operation at the first exposure level to determine a first focus position; performing a second auto exposure control operation with a second set of target parameters to determine a second exposure level after performing the first auto focus operation; and/or capturing a first image frame at the second exposure level.

In an additional aspect of the disclosure, an apparatus includes means for performing a first auto exposure control operation with a first set of target parameters to determine a first exposure level; means for performing a first auto focus operation at the first exposure level to determine a first focus position; means for performing a second auto exposure control operation with a second set of target parameters to determine a second exposure level after performing the first auto focus operation; and/or means for capturing a first image frame at the second exposure level.

In an additional aspect of the disclosure, a non-transitory computer-readable medium stores instructions that, when executed by a processor, cause the processor to perform operations. The operations include performing a first auto exposure control operation with a first set of target parameters to determine a first exposure level; performing a first auto focus operation at the first exposure level to determine a first focus position; performing a second auto exposure control operation with a second set of target parameters to determine a second exposure level after performing the first auto focus operation; and/or capturing a first image frame at the second exposure level.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving image capture devices having image sensors and image signal processors (ISPs). The image signal processor may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor or corrected image frames processed by one or more algorithms within the image signal processor. For example, an image frame obtained from an image sensor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may have improved appearance in low-light conditions.

In some aspects, the corrected image frame may be produced by combining aspects of the image correction of this disclosure with other computational photography techniques such as high dynamic range (HDR) photography or multi-frame noise reduction (MFNR). With HDR photography, the first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the image correction or otherwise controlling aspects of the image correction, such as by specifying a autofocus (AF) region of interest and/or target parameters for AEC convergence. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
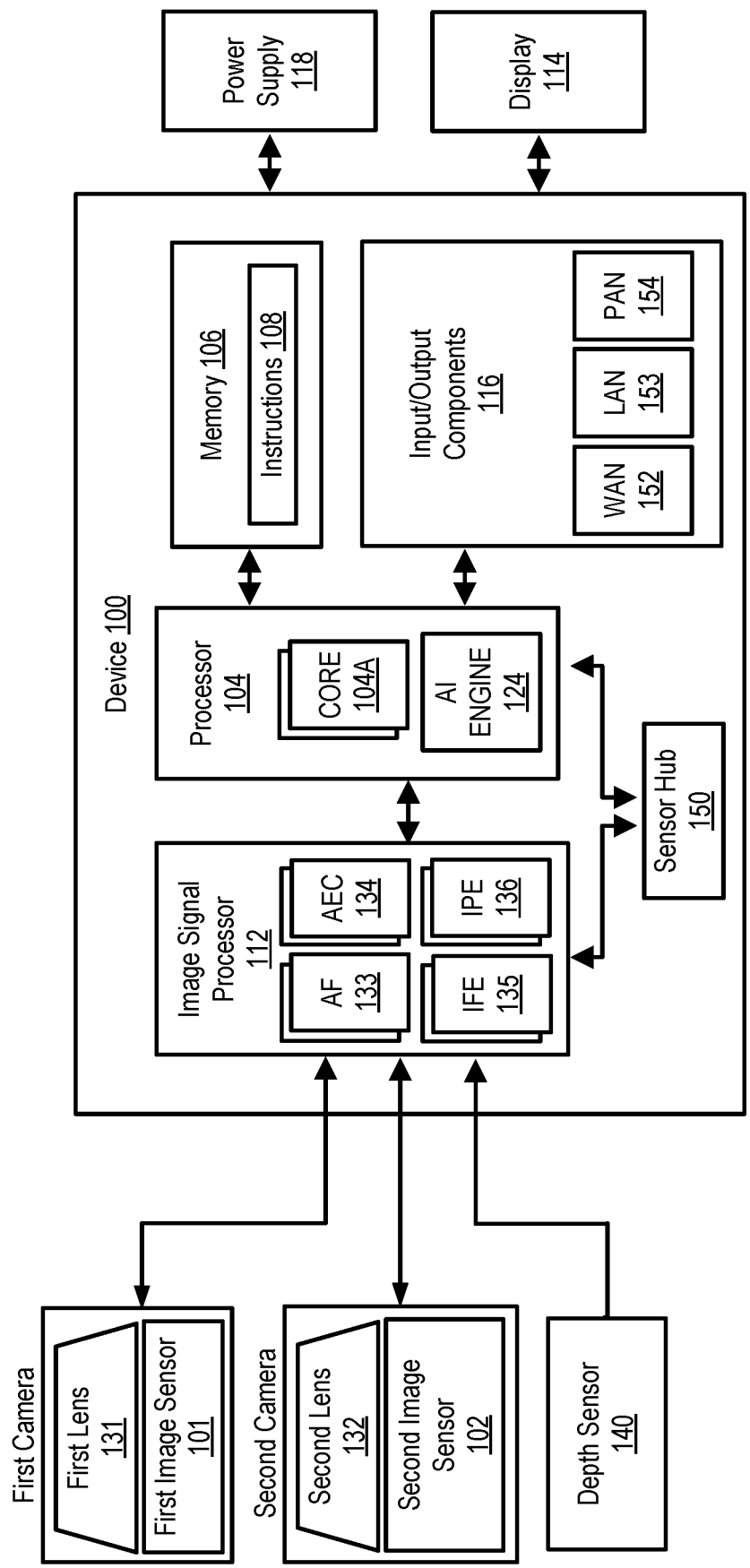
FIG. 1 shows a block diagram of an example device 100 for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The inherent limitations on image sensors in image capture devices may result in low-quality images. The low-quality images produced by the image sensor can also create problems for other aspects of image signal processing. For example, the low-quality images produced in low-light conditions challenge camera control algorithms, which can further reduce the image quality. For example, auto focus (AF) operations based on detecting contrast in an image frame may be difficult to complete in low-light conditions where there is little contrast available. As another example, AF operations based on detecting contrast in a low-light portion of a high-dynamic range image may be difficult to complete where there is little contrast available. Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described below may present other benefits than, and be used in other applications than, those described above.

The present disclosure provides systems, apparatus, methods, and computer-readable media that support improved image signal processing, particularly in low-light or high dynamic range (HDR) scenes. The image processing techniques may include performing two automatic exposure control (AEC) operations, in which a first AEC operation targets obtaining conditions that improve convergence and confidence for autofocus (AF) operation, and a second AEC operation follows the AF operation and targets obtaining good conditions for an image capture. The image processing techniques may also include communication between the AEC operations and AF operations to coordinate the operations by locking and releasing exposure levels and focus positions as part of the image signal processing.

In one aspect, a processing technique may include an AF algorithm measuring statistics from a target region of interest (which may be a detected object of interest, such as a face), coordinating with an AEC algorithm, and performing interleaving of a lock-and-resume state machine to achieve better AF result in challenging low-light or HDR scenes while maintaining an overall image quality as preferred by the AEC operation. The coordination may include the AF locking on a first focus position waiting for the first AEC operation to complete. The AEC operation may converge on a first exposure level that reveals detail within a region of interest, after which the exposure level locks and the AF algorithm unlocks and determines a focus position for the region of interest while the exposure level is locked. After the AF operation completes, the AF algorithm locks focus point and the AEC algorithm unlocks the exposure level and performs a second AEC operation to adjust the exposure level to obtain a desired image result. In some embodiments, the AF may unlock the focus position during adjusting of the exposure level during the second AEC operation.

Particular implementations of the subject matter described in this disclosure may be implemented to realize one or more of the following potential advantages or benefits. In some aspects, the present disclosure provides techniques for image signal processing methods in which the AF can actively cooperate with the AEC for better AF result in low-light or HDR scenes without changing the original AEC preference. This may result in a faster and/or more accurate focus operation, which results in photographs with more in-focus regions and thus improved image quality (as measured by preserving detail of the scene), while still having desirable lighting qualities throughout the photograph, and particularly in high dynamic range (HDR) photography.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image post-processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical button interface. I/O components 116 may also include network interfaces for communicating with other devices, including a wide area network (WAN) adaptor 152, a local area network (LAN) adaptor 153, and/or a personal area network (PAN) adaptor 154. Examples of WAN adaptor 152 include a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna and may be coupled to multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, one or more transceivers and a baseband processor may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver. The data from sensor hub 150 may be used by the image signal processor 112 for generating corrected image frames, such as by applying electronic image stabilization (EIS) and/or digital image stabilization (DIS).

The image signal processor 112 may receive image data from one or more cameras in the form of image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

A first camera may include the first image sensor 101 and a corresponding first lens 131. A second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane corresponding to a certain focus position. The AF algorithm 133 may be assisted by depth sensor 140 by using depth data to approximate a focus position.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102 to generate corrected image frames based on an image frame captured by the depth sensor 140. The depth sensor 140 may also be used to apply a correction to a first image frame captured from one of the image sensors 101 and 102, such as by using the depth data to segment an image frame from the sensors 101 or 102 into a foreground and background region and separately processing the foreground and background regions when determining a corrected first image frame. Although the apparatus shown in FIG. 1 may reflect a configuration for some embodiments of the disclosed image signal processing techniques and methods, any number of additional image sensors or image signal processors may be included in other embodiments of the device 100 while still implementing aspects of the disclosed image signal processing techniques and methods.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more automatic exposure control (AEC) 134 engines, and/or one or more autofocus (AF) 133 engines. The AF 133, AEC 134, IFE 135, IPE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including the AEC and AF operations and coordination of the AEC and AF operations. For example, execution of the instructions can instruct the image signal processor 112 to begin or end capturing an image frame or a sequence of image frames, in which the capture includes AF and AEC operations as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Auto focus (AF) 133 analyzes an image frame and determines a focus position for moving the lens of the corresponding image sensor. The focus position determined by the AF 133 affects image quality, because if the wrong focus position is set for the lens then the resulting image is blurry. One example technique for the AF 133 is contrast autofocus (CAF), in which a focus position (FV) may be generated for several lens stop positions, and the lens positioned to a focus position at the peak of the focus position versus lens stop position curve to capture an in-focus image of a scene. Another example technique for the AF 133 is phase detection auto focus (PDAF), in which the AF 133 may use phase difference determined from an image frame captured by the image sensor to estimate a focus position and move the lens to capture an in-focus image of a scene at that focus position.

The AF 133 and AEC 134 operate to allow a "point-and-shoot" operation by a user of the image capture device 100. Using AF 133 and AEC 134, the user is not required to manually adjust a lens position or manually determine exposure levels. AF 133 and AEC 134 allow capturing of image frames to be much quicker than by manual adjustment of these camera parameters and improve user experience by reducing the complexity of photography for the user. One example process for automating image capture is shown in FIG. 2.

Figure 2:
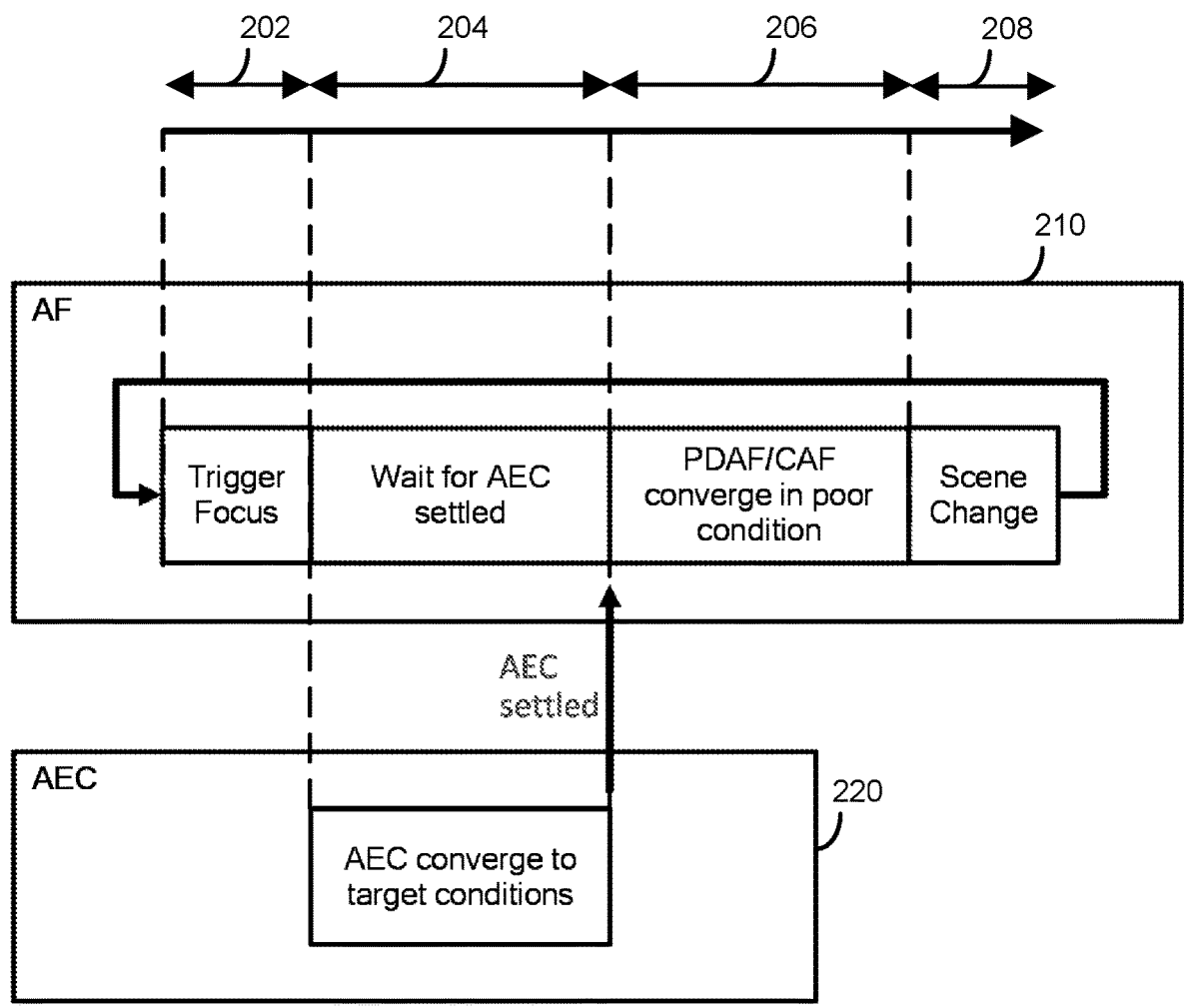
FIG. 2 is a block diagram illustrating operation of AF and AEC according to one or more aspects.

FIG. 2 is a block diagram illustrating operation of AF and AEC according to one or more aspects. An AF 210 operation begins with a trigger at time 202. The trigger may be, for example, the loading of a camera application that requests a preview stream of image frames of a scene in view of an image sensor. After the trigger at time 202, automatic exposure control (AEC) 220 operates in time 204 to converge to an exposure level that meets a set of target parameters. During time 204, the auto focus (AF) 210 waits for the AEC to converge and settle at the exposure level. After convergence of the AEC 220, the AF 210 operates in time 206 to determine a focus position for adjusting a lens of the camera. However, the converged exposure level after time 204 may create poor conditions for the AF 210 to identify the focus position. Such poor conditions may include low-light, low-contrast, low PDAF confidence, high sensor gain (which may lead to high noise), etc. The AEC 220 determines a proper luma target for a current region of interest (ROI). However, the AEC 220 and the AF 210 may have different desired camera parameters, especially in a high-dynamic-range (HDR) scene. For example, in a scene with a person standing in front of a window there may be a strong backlight condition in which AEC 220 prefers to decrease the target brightness to avoid over-exposure of the highlight background part. This may create poor conditions for AF 210 because the region of interest for the focus point, the face of the person standing in front of the window, is poorly lit, which impedes the identification of a focus position for focusing on the region of interest because of poor contrast in the shadow region of the scene.

Figure 3:
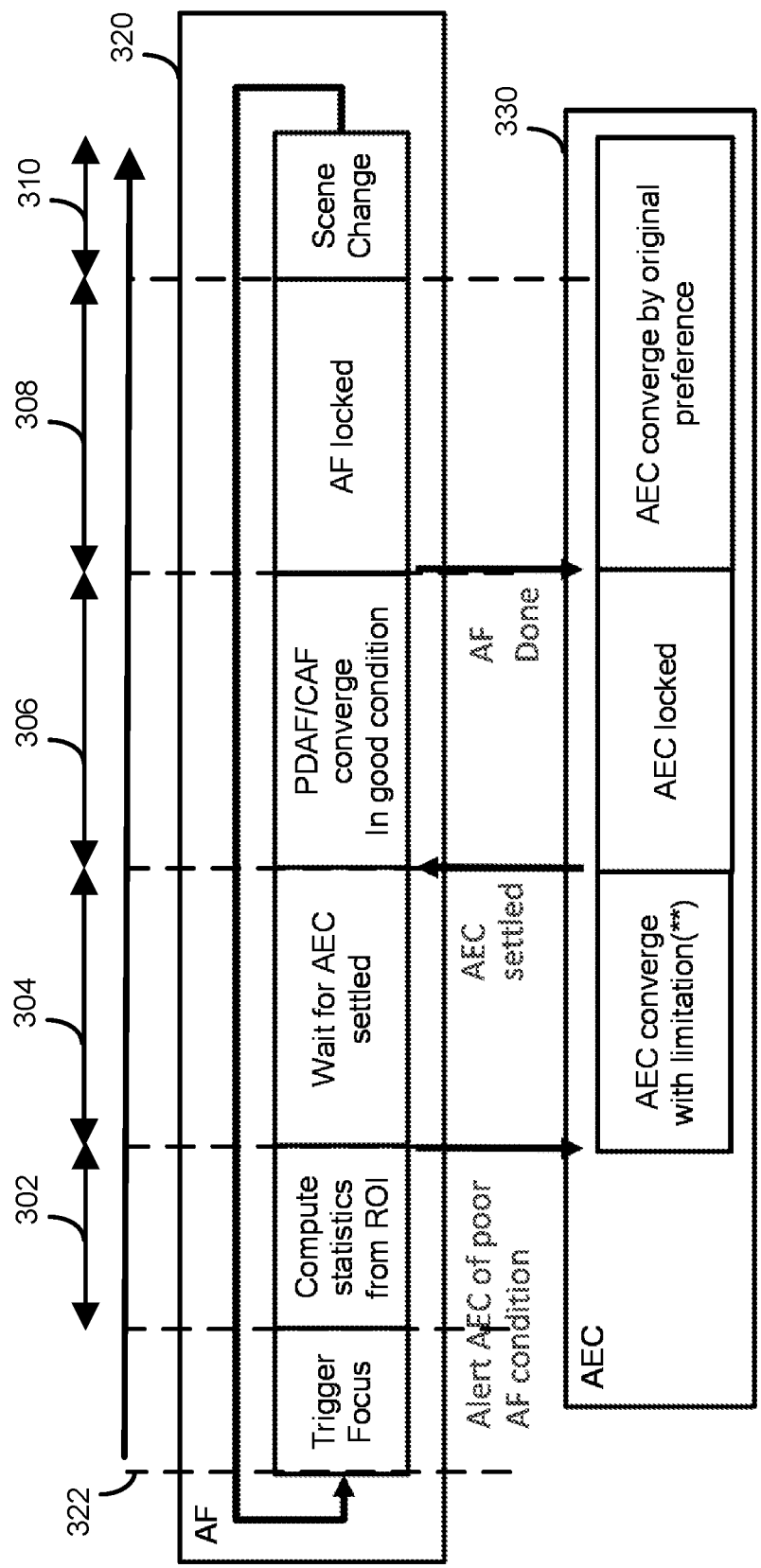
FIG. 3 is a block diagram illustrating one example of coordination between automatic exposure control (AEC) and auto focus (AF) according to one or more aspects.

Embodiments of this disclosure provide a mechanism in which the AEC may be configurable with different target parameters during operation of a camera. The different target parameters may allow the AEC to temporarily control exposure to improve the auto focus operation and then to resume controlling exposure to improve overall image quality. In some embodiments, the AEC is configured as part of an operational state machine. For example, during camera operation the AF may measure statistics from a target, the AF coordinates with the AEC, and performs an interleaving lock/resume on the focus point and/or exposure level to achieve better AF result in challenging low-light or HDR scenes. FIG. 3 is a block diagram illustrating one example of coordination between automatic exposure control (AEC) and auto focus (AF) according to one or more aspects.

Communication between the auto focus (AF) 320 and automatic exposure control (AEC) 330 may improve image quality by allowing the AEC 330 to operate to improve image conditions in a region of interest for AF, allow the AF to determine the focus position, and then allow the AEC 330 to converge to an exposure level that provides a high overall image quality. The AEC 330 may be configured using two or more sets of target parameters for determining an exposure level, a first set of target parameters determines a first exposure level to improve focus (such as by improving brightness and/or contrast in a region of interest) in a region of interest of a scene for use during time 304 and a second set of target parameters determines a second exposure level to improve overall image appearance for use during time 308.

An AF 320 operation begins with a trigger 322. The trigger 322 may be, for example, the loading of a camera application that requests a preview stream of image frames of a scene in view of an image sensor. After the trigger 322, one or more values (e.g., statistics) may be computed for a region of interest in an image frame. The values may include a luma level, a contrast value, a confidence level of a PDAF focus determination, and/or a sensor level. The region of interest (ROI) may be determined based on one or more of a user touch point on the image frame, a determined saliency value, a gaze of a user observing a display as determined through eye-tracking, a center of the image frame, and/or a detected object (e.g., a face). The image conditions in the ROI may be determined based on the values. For example, one or more conditions (e.g., rules) may be evaluated based on the values to determine if there are poor conditions for AF operation in the ROI. In one example, luma statistics may be determined for the ROI to determine if the average luma value is lower than a threshold indicating poor conditions exist for the AF 320. When poor AF conditions are identified during time period 302, the AF 320 may communicate to the AEC 330, such as through the image signal processor, to perform AEC convergence to increase the average luma value (e.g., brightness) in the ROI.

At time 304, the AEC 330 operates using a first set of target parameters to improve the ROI in a manner that improves the AF 320's determination of a focus position for the ROI. During time period 304, the AF 320 waits for the AEC 330 to settle. In some embodiments, the AF 320 begins the autofocus operation of time period 306 after a certain period of time. In some embodiments, the AF 320 begins the autofocus operation of time period 306 after the AEC 330 reaches a convergence condition. In some embodiments, the AF 320 begins the autofocus operation of time period 306 when the AEC 330 communicates to the AF 320 to begin the autofocus operation.

During time period 306, the AF 320 determines a focus position with auto focusing while the AEC is locked at a first exposure level determined during time period 304. In some embodiments, the AEC 330 begins a new AEC operation using a second set of target parameters after a certain period of time. In some embodiments, the AEC 330 begins a new AEC operation using a second set of target parameters after the AF 320 reaches a convergence condition. In some embodiments, the AEC 330 begins a new AEC operation using a second set of target parameters after the AF 320 communicates to the AEC 330 to begin a new AEC operation.

During time period 308, the AEC 330 operates using the second set of target parameters to determine an exposure level that meets the second set of target parameters to improve the image appearance. During this AEC operation, the AF 320 locks the focus position and the AEC 330 continues to converge using the second set of target parameters. The scene may continue to change during time period 308 and the AEC 330 continues to adjust in response to converge using the second set of target parameters. For example, a light in the scene may be turned on, causing the AEC 330 to adjust the exposure level to compensate for the new light. During time period 308, a scene change may be detected at time 310 upon which the algorithm may be restarted and return to time 302. The focus position may remain locked during time period 308 with the AF 320 operation disabled. Image frames may continue to be generated from the ISP during time 308 and output in a preview display of a camera application executing on the image capture device. A snapshot image frame may be captured during the time period 308, such as in response to a user input pressing a shutter to request an image capture. If a shutter is pressed during other time periods 302, 304, 306, or 310, the capturing of a snapshot image frame in response to the shutter may be delayed until time 308.

The operations described with reference to FIG. 3 may be configured in an image signal processor using a lock-and-resume state machine, in which there are states in the AF 320 for locking the focus position in time period 304 and time period 308 and resuming the focus position determination in time period 306 and for locking the exposure level in time period 306 and resuming the exposure level determination in time periods 304 and 308.

Figure 4A:
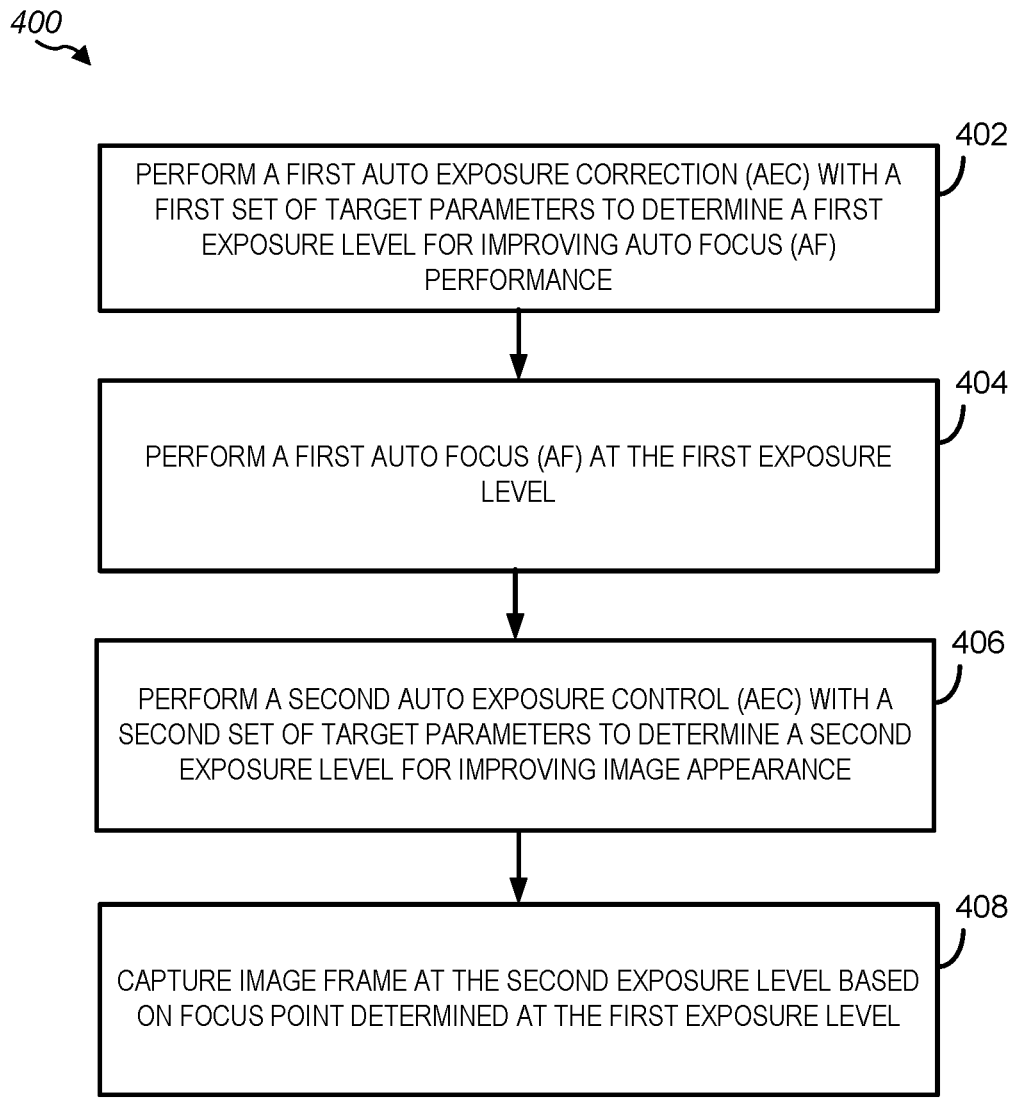
FIG. 4A is a flow chart illustrating a method of image signal processing using two AEC operations according to one or more aspects.

A method for image signal processing with two AEC operations to improve AF operations is shown in FIG. 4A. FIG. 4A is a flow chart illustrating a method of image signal processing using two AEC operations according to one or more aspects. FIG. 4A begins at block 402 with performing a first auto exposure control (AEC) operation with a first set of target parameters to determine a first exposure level for improving auto focus (AF) performance. For example, the target parameters may include be an increased average luma value for a region of interest identified in the scene.

At block 404, a first auto focus (AF) operation is performed at the first exposure level, such as with the first exposure level locked until the completion of the AF operation. The locked exposure level determined at block 402 may provide additional detail within a region of interest in the scene. For example, if the region of interest is in a shadow region, a higher exposure level determined at block 402 may increase detail within the shadow region. As another example, if the region of interest is in a highlight region, a lower exposure level determined at block 402 may increase detail within the highlight region.

At block 406, a second AEC operation is performed with a second set of target parameters to determine a second exposure level for improving image appearance. The second set of target parameters may target converging towards a particular average luma value across the entire scene, even if detail is lost in a region of interest within the scene. With the focal distance already determined at block 404, detail in the region of interest may be sacrificed to improve overall image quality. In some embodiments, an AF operation may continue during the second AEC operation of block 406. For example, minor variations to the focal distance may be made by a PDAF and/or CAF algorithm to maintain the appearance of the image frame. If the AF looses tracking of the focal point, a scene change may be determined and the method 400 returns to block 402 to restart the AF and AEC operations. In some embodiments, the AF operation performed during the second AEC operation of block 406 may be through a second AF system, such as a laser-assisted AF system.

At block 408, an image frame may be captured at the second exposure level determined at block 406 based on a focus position determined by the AF operation of block 404 that was determined at the first exposure level from block 402. The image frame may be used as part of a preview display in a camera application, saving and/or transmitting a still image frame as a photography, and/or saving and/or transmitting a video sequence of still image frames.

In some scenes, the conditions may be sufficient for determining a focus position in the ROI without an additional AEC operation as shown in FIG. 3. In such conditions, the image signal processor after time period 302 may execute an algorithm corresponding to times 202, 204, 206, 208 of FIG. 2. A method for image signal processing for switching between one AEC and two AEC operations depending upon image conditions is shown in FIG. 4B.

Figure 4B:
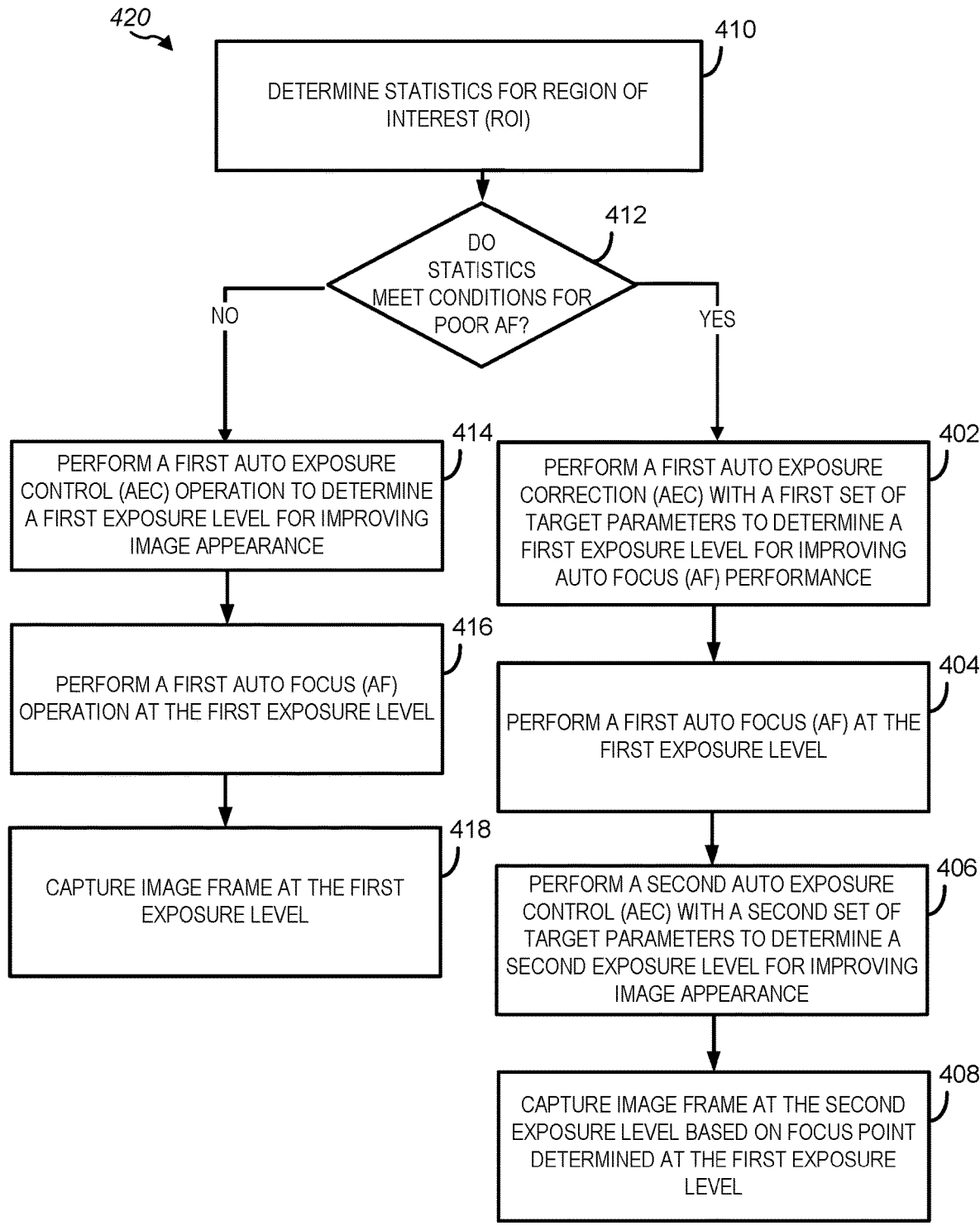
FIG. 4B is a flow chart illustrating a method of image signal processing using two AEC operations according to one or more aspects.

FIG. 4B is a flow chart illustrating a method of image signal processing using two AEC operations according to one or more aspects. At block 410 of method 420, one or more statistics are determined for a region of interest (ROI) in an image frame obtained from an image sensor. At block 412, the statistics are used to determine if one or more conditions are satisfied that indicate poor AF operation. For example, poor conditions for AF operation may include one or more of low contrast in the region of interest, low confidence in a focus position, slow convergence in an autofocus (AF) operation (e.g., a convergence rate below a rate threshold), or low light levels in the region of interest (e.g., light levels below a light threshold). If so, the method 420 continues to perform the operations of blocks 402, 404, 406, and 408 as in FIG. 4A. If the conditions are not satisfied at block 412 then the method 420 continues to blocks 414, 416, and 418 to perform image frame capture using a single AEC operation. At block 414, a first AEC operation is performed to determine a first exposure level. At block 416, a first AF operation is performed at the first exposure level. At block 416, an image frame is captured at the first exposure level and the focus position determined by the AF operation of block 416 while locked at the first exposure level.

Multiple auto focus (AF) techniques may be available on an image capture device. For example, a laser auto focus (AF), such as a Time-of-Flight (TOF) sensor, may be available in the image capture device and used to improve a focus position. One advantage of laser-assisted AF is that it doesn't rely on light from the target, and instead, emits a beam of light from which the distance to the object can then be determined. Laser-assisted AF may be particularly advantageous in low-light conditions. One example use of a second AF system, such as a laser-assisted AF, in an image frame capture with two AEC operations is shown in FIG. 5.

Figure 5:
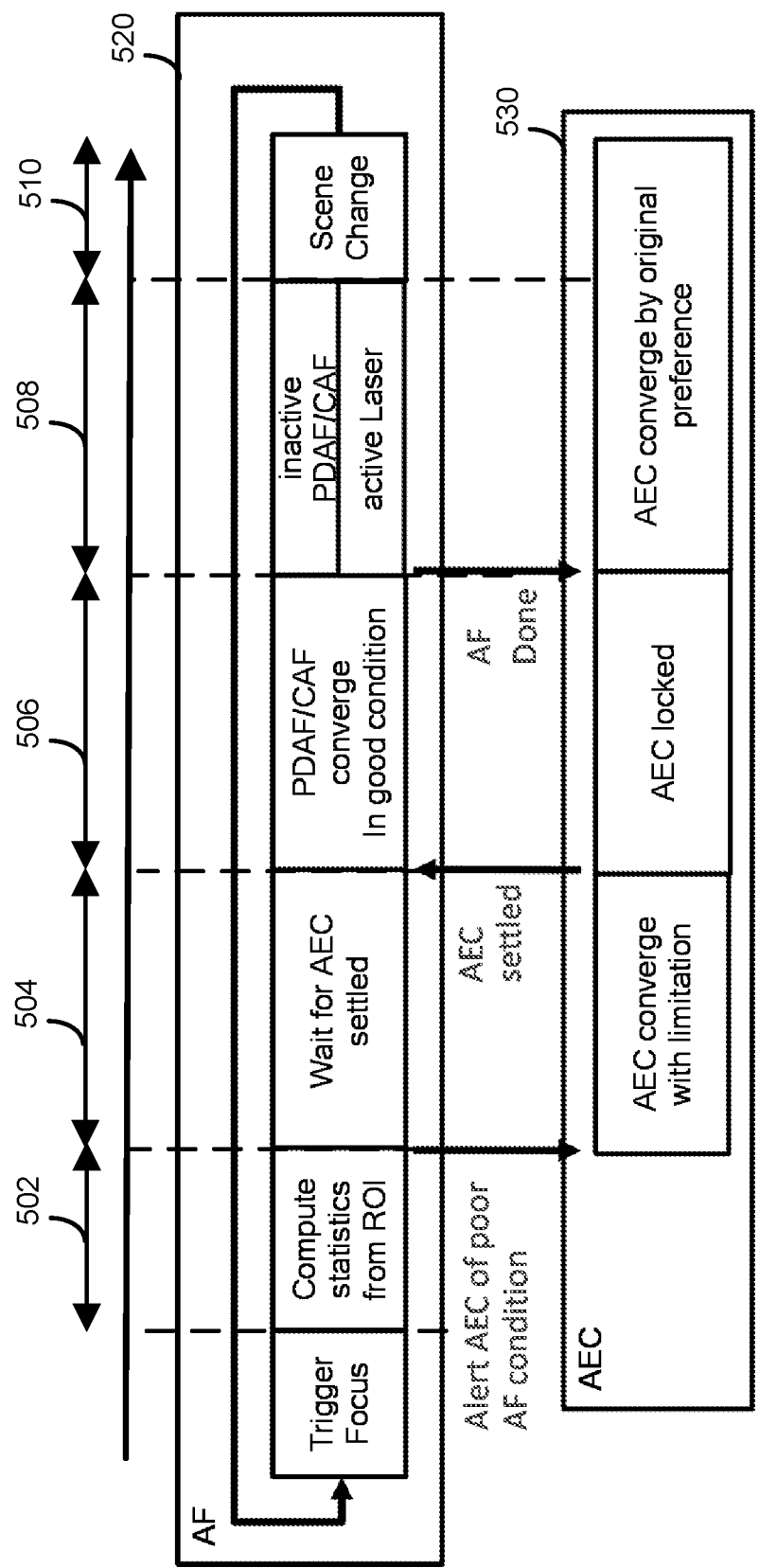
FIG. 5 is a block diagram illustrating one example of coordination between automatic exposure control (AEC) and auto focus (AF) according to one or more aspects.

FIG. 5 is a block diagram illustrating one example of coordination between automatic exposure control (AEC) and auto focus (AF) according to one or more aspects. Time period 502 may operate similar to time period 302. Time period 504 may operate similar to time period 304. Time period 506 may operate similar to time period 306. Time period 508 may operate similar to time period 308. Time period 510 may operate similar to time period 310. AF 520 may be configured similar to AF 320. AEC 530 may be configured similar to AF 320. The additional AF technique, such as laser-assisted AF, may be applied during time period 508 to provide some focus correction during time period 508, which may allow delaying a scene change determination during time period 510 that returns operation to time period 502. Allowing the time period 508 to extend longer may improve responsiveness to a user shutter depression when snapshots are delayed until time 508. In some embodiments, the time period 508 may end when a the second AF operation detects a change in focal distance exceeding a threshold value. Further, focus correction within time period 508 may provide improved image quality by increasing the likelihood that a captured image frame is captured at a correct focus position for the distance of the ROI. In some embodiments, the AF technique used in time period 508 to make adjustments to the focal distance during the second AEC operation may remain active.

It is noted that one or more blocks (or operations) described with reference to FIGS. 1-5 may be combined with one or more blocks (or operations) described with reference to another of the figures. For example, one or more blocks (or operations) of FIG. 2 may be combined with one or more blocks (or operations) of FIG. 3 or FIG. 5. As another example, one or more blocks associated with FIG. 4A or FIG. 4B may be combined with one or more blocks associated with FIG. 5. Additionally, or alternatively, one or more operations described above with reference to FIG. 1 may be combined with one or more operations described with reference to FIGS. 2-5.

In one or more aspects, techniques for supporting image signal processing may include additional aspects, such as any single aspect or any combination of aspects described below or in connection with one or more other processes or devices described elsewhere herein. In some aspects, supporting image signal processing may include an apparatus including an image sensor and an image signal processor. The apparatus is further configured to perform steps including performing a first auto exposure control (AEC) with a first set of target parameters to determine a first exposure level; performing auto focus (AF) at the first exposure level; and/or performing a second auto exposure control (ARC) with a second set of target parameters to determine a second exposure level. Additionally, the apparatus may perform or operate according to one or more aspects as described herein. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In one or more aspects, techniques for supporting image capture and/or image processing may include additional aspects, such as any single aspect or any combination of aspects described below or in connection with one or more other processes or devices described elsewhere herein. In a first aspect, supporting image capture and/or image processing may include an apparatus configured to perform operations comprising performing a first auto exposure control operation with a first set of target parameters to determine a first exposure level; performing a first auto focus operation at the first exposure level to determine a first focus position; performing a second auto exposure control operation with a second set of target parameters to determine a second exposure level after performing the first auto focus operation; and capturing a first image frame at the second exposure level. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of image processing and/or image capture may include one or more operations described herein with reference to the apparatus.

In a second aspect, in combination with the first aspect, performing the first auto exposure control operation with the first set of target parameters determines the first exposure level to improve focus in a region of interest of a scene.

In a third aspect, in combination with one or more of the first aspect or the second aspect, performing the first auto exposure control (AEC) operation comprises at least one of raising a target exposure, reducing a target exposure, raising a sensor gain, reducing a sensor gain, increasing an exposure duration, and/or reducing an exposure duration.

In a fourth aspect, in combination with one or more of the first aspect through the third aspect, the apparatus is further configured to perform operations including determining a value representative of a characteristic of a region of interest before performing the first auto exposure control operation with the first set of target parameters; and determining whether the value satisfies a condition, wherein performing the first auto exposure control operation with the first set of target parameters is in response to determining whether the value satisfies the condition.

In a fifth aspect, in combination with one or more of the first aspect through the fourth aspect, determining whether the value satisfies the condition comprises determining whether the value indicates one or more of contrast in the region of interest below a contrast threshold, low confidence in a focus position, a convergence rate of an autofocus operation being below a rate threshold, or light levels in the region of interest being below a light threshold.

In a sixth aspect, in combination with one or more of the first aspect through the fifth aspect, determining the value representative of the characteristic of the region of interest comprises determining at least one of a luma, a contrast, a PDAF confidence level, or a sensor level.

In a seventh aspect, in combination with one or more of the first aspect through the sixth aspect, the apparatus is further configured to perform operations including performing a second auto focus operation during performing the second auto exposure control operation.

In an eighth aspect, in combination with one or more of the first aspect through the seventh aspect, performing the second auto focus operation comprises performing a laser-assisted auto focus operation.

In a ninth aspect, in combination with one or more of the first aspect through the eighth aspect, the apparatus is further configured to perform operations including detecting a scene change after performing the second auto exposure control operation; and in response to detecting the scene change, repeating performing the first auto exposure control operation and performing the first auto focus operation.

In a tenth aspect, in combination with one or more of the first aspect through the ninth aspect, the apparatus is further configured to perform operations including receiving, by at least one processor, first information regarding the first auto exposure control operation; controlling, by at least one processor, performing of the first auto focus operation based on the first information; receiving, by at least one processor, second information regarding the first auto focus operation; and controlling, by at least one processor, performing of the second auto exposure control operation based on the second information.

In an eleventh aspect, in combination with one or more of the first aspect through the tenth aspect, the apparatus further includes a camera.

In one or more aspects, techniques for supporting image capture and/or image processing may include additional aspects, such as any single aspect or any combination of aspects described above or below or in connection with one or more other processes or devices described elsewhere herein. In a twelfth aspect, supporting image capture and/or image processing may include an apparatus configured to perform operations including receiving a first image frame from a camera; determining a statistic regarding a region of interest of the first image frame; determining whether the statistic satisfies a condition; and when the statistic satisfies the condition: performing a first auto exposure control operation with a first set of target parameters to determine a first exposure level; performing a first auto focus operation at the first exposure level to determine a first focus position; performing a second auto exposure control operation with a second set of target parameters to determine a second exposure level after performing the first auto focus operation; receiving a set of image frames while performing the second auto exposure control operation; detecting a scene change between two image frames of the set of image frames; and after detecting a scene change: repeating the operations of receiving a first image frame, determining a statistic, and determining whether the statistic satisfies the condition. Additionally, the apparatus may perform or operate according to one or more aspects as described above or below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of image processing and/or image capture may include one or more operations described herein with reference to the apparatus.

In a thirteenth aspect, in combination with one or more of the first aspect through the twelfth aspect, the apparatus is further configured to perform a second auto focus operation during performing the second auto exposure control operation.

In a fourteenth aspect, in combination with one or more of the first aspect through the thirteenth aspect, performing the second auto focus operation comprises performing a laser-assisted auto focus operation.

In a fifteenth aspect, in combination with one or more of the first aspect through the fourteenth aspect, the apparatus is further configured to capture a second image frame at the second exposure level while performing the second auto focus operation.

In a sixteenth aspect, in combination with one or more of the first aspect through the fifteenth aspect, detecting the scene change between two image frames of the set of image frames comprises determining a change in focal distance of the laser-assisted auto focus operation exceeds a distance threshold.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-5 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
performing a first auto exposure control operation with a first set of target parameters to determine a first exposure level;
performing a first auto focus operation at the first exposure level to determine a first focus position;
performing a second auto exposure control operation with a second set of target parameters to determine a second exposure level after performing the first auto focus operation;
capturing a first image frame at the second exposure level;
detecting a scene change after performing the second auto exposure control operation by determining, based on a second auto focus operation, a change in focal distance exceeds a threshold value; and
in response to detecting the scene change, repeating performing the first auto exposure control operation and performing the first auto focus operation.

2. The method of claim 1, wherein performing the first auto exposure control operation with the first set of target parameters determines the first exposure level to improve focus in a region of interest of a scene.

3. The method of claim 2, wherein performing the first auto exposure control operation comprises at least one of raising a target exposure or reducing a target exposure.

4. The method of claim 1, further comprising:
determining a value representative of a characteristic of a region of interest before performing the first auto exposure control operation with the first set of target parameters; and
determining whether the value satisfies a condition,
wherein performing the first auto exposure control operation with the first set of target parameters is in response to determining whether the value satisfies the condition.

5. The method of claim 4, wherein determining whether the value satisfies the condition comprises determining whether the value indicates one or more of contrast in the region of interest below a contrast threshold, low confidence in a focus position, a convergence rate of an autofocus operation being below a rate threshold, or light levels in the region of interest being below a light threshold.

6. The method of claim 4, wherein determining the value representative of the characteristic of the region of interest comprises determining at least one of a luma, a contrast, a PDAF confidence level, or a sensor level.

7. The method of claim 1, further comprising:
performing the second auto focus operation during performing the second auto exposure control operation.

8. The method of claim 1, wherein performing the second auto focus operation comprises performing a laser-assisted auto focus operation.

9. The method of claim 1, further comprising:
receiving, by at least one processor, first information regarding the first auto exposure control operation;
controlling, by at least one processor, performing of the first auto focus operation based on the first information;
receiving, by at least one processor, second information regarding the first auto focus operation; and
controlling, by at least one processor, performing of the second auto exposure control operation based on the second information.

10. An apparatus, comprising:
a memory storing processor-readable code; and
at least one processor coupled to the memory, the at least one processor configured to:
perform a first auto exposure control operation with a first set of target parameters to determine a first exposure level;
perform a first auto focus operation at the first exposure level to determine a first focus position;
perform a second auto exposure control operation with a second set of target parameters to determine a second exposure level after performing the first auto focus operation;
capture a first image frame at the second exposure level;
detect a scene change after performing the second auto exposure control operation by determining, based on a second auto focus operation, a change in focal distance exceeds a threshold value; and
in response to detecting the scene change, repeat performing the first auto exposure control operation and performing the first auto focus operation.

11. The apparatus of claim 10, wherein performing the first auto exposure control operation with the first set of target parameters determines the first exposure level to improve focus in a region of interest of a scene by increasing brightness in the region of interest of the scene.

12. The apparatus of claim 11, wherein the at least one processor is further configured to:
determine a value representative of a characteristic of the region of interest before performing the first auto exposure control operation with the first set of target parameters; and
determine whether the value satisfies a condition,
wherein the at least one processor performs the first auto exposure control operation with the first set of target parameters in response to determining whether the value satisfies the condition.

13. The apparatus of claim 12, wherein determining whether the value satisfies the condition comprises determining whether the value indicates one or more of low contrast in the region of interest, low confidence in a focus position, a convergence rate in an autofocus operation being below a rate threshold, or a light level in the region of interest being below a light threshold.

14. The apparatus of claim 10, wherein the at least one processor is further configured to:
perform the second auto focus operation during performing the second auto exposure control operation.

15. The apparatus of claim 1, wherein performing the second auto focus operation comprises performing a laser-assisted auto focus operation.

16. The apparatus of claim 10, wherein the at least one processor is further configured to:
receive first information regarding the first auto exposure control operation;
control performing of the first auto focus operation based on the first information;
receive second information regarding the first auto focus operation; and
control performing of the second auto exposure control operation based on the second information.

17. A non-transitory computer-readable medium storing instructions that, when executed by a processor, cause the processor to perform operations comprising:
performing a first auto exposure control operation with a first set of target parameters to determine a first exposure level;
performing a first auto focus operation at the first exposure level to determine a first focus position;
performing a second auto exposure control operation with a second set of target parameters to determine a second exposure level after performing the first auto focus operation;
capturing a first image frame at the second exposure level;
detecting a scene change after performing the second auto exposure control operation by determining, based on a second auto focus operation, a change in focal distance exceeds a threshold value; and
in response to detecting the scene change, repeating performing the first auto exposure control operation and performing the first auto focus operation.

18. The non-transitory computer-readable medium of claim 17, wherein performing a first auto exposure control operation with a first set of target parameters determines a first exposure level to improve focus in a region of interest of a scene by increasing brightness in the region of interest of a scene.

19. The non-transitory computer-readable medium of claim 17, wherein the instructions, when executed by the processor, cause the processor to perform further operations comprising:
determining a value representative of a characteristic of a region of interest before performing the first auto exposure control operation with the first set of target parameters; and
determining whether the value satisfies a condition,
wherein performing the first auto exposure control operation with the first set of target parameters is in response to determining whether the value satisfies the condition.

20. The non-transitory computer-readable medium of claim 17, wherein the instructions, when executed by the processor, cause the processor to perform further operations comprising:
performing the second auto focus operation during performing the second auto exposure control operation.

21. The non-transitory computer-readable medium of claim 17, wherein the instructions, when executed by the processor, cause the processor to perform further operations comprising:
receiving first information regarding the first auto exposure control operation;
controlling performing of the first auto focus operation based on the first information;
receiving second information regarding the first auto focus operation; and
controlling performing of the second auto exposure control operation based on the second information.

22. An apparatus, comprising:
a camera;
a memory; and
at least one processor coupled to the memory and configured to:
receive a first image frame from the camera;
determine a statistic regarding a region of interest of the first image frame;
determine whether the statistic satisfies a condition;
when the statistic satisfies the condition;
perform a first auto exposure control operation with a first set of target parameters to determine a first exposure level;
perform a first auto focus operation at the first exposure level to determine a first focus position;
perform a second auto exposure control operation with a second set of target parameters to determine a second exposure level after performing the first auto focus operation;
receive a set of image frames while performing the second auto exposure control operation;
detect a scene change between two image frames of the set of image frames by determining a change in focal distance exceeds a threshold value; and
after detecting a scene change: repeat operations that receive a first image frame, determine a statistic, and determine whether the statistic satisfies the condition.

23. The apparatus of claim 22, wherein the at least one processor is further configured to:
perform a second auto focus operation during performing the second auto exposure control operation.

24. The apparatus of claim 23, wherein performing the second auto focus operation comprises performing a laser-assisted auto focus operation.

25. The apparatus of claim 23, wherein the at least one processor is further configured to:
capture a second image frame at the second exposure level while performing the second auto focus operation.

* * * * *